United States Patent
Wu et al.

(10) Patent No.: US 7,292,562 B2
(45) Date of Patent: **\*Nov. 6, 2007**

(54) MEASURING THE THROUGHPUT OF TRANSMISSIONS OVER WIRELESS LOCAL AREA NETWORKS

(75) Inventors: Miles Wu, Fremont, CA (US); Chia-Chee Kuan, Los Altos, CA (US); Dean Au, Sunnyvale, CA (US)

(73) Assignee: Airmagnet, Inc., Sunnyvale, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 11/331,488

(22) Filed: Jan. 13, 2006

(65) Prior Publication Data
US 2006/0114875 A1    Jun. 1, 2006

Related U.S. Application Data

(63) Continuation of application No. 10/087,045, filed on Feb. 28, 2002, now Pat. No. 7,009,957.

(51) Int. Cl.
*H04Q 7/24* (2006.01)

(52) U.S. Cl. ............ 370/338; 370/394; 370/401
(58) Field of Classification Search .......... None
See application file for complete search history.

(56) References Cited

U.S. PATENT DOCUMENTS

| | | | |
|---|---|---|---|
| 6,629,151 B1 * | 9/2003 | Bahl | 709/250 |
| 6,907,005 B1 * | 6/2005 | Dahlman et al. | 370/236 |
| 2002/0027884 A1 * | 3/2002 | Halme | 370/253 |
| 2002/0089959 A1 * | 7/2002 | Fischer et al. | 370/338 |

* cited by examiner

*Primary Examiner*—Duc Ho
(74) *Attorney, Agent, or Firm*—Blakely, Sokoloff, Taylor & Zafman LLP

(57) ABSTRACT

A method and system for measuring the throughput of transmissions over a wireless local area network having a station and an access point. The station can send messages to the access point during a test period, where the messages can be sent as data frames. The access point can receive messages sent from the station during the test period. For messages received by the access point, the access point can send acknowledgements to the station, where the acknowledgements can be sent as control frames. The station can receive acknowledgements from the access point for messages received by the access point. The station can determine a throughput from the station to the access point for the test period based on the acknowledgements received at the station from the access point during the test period.

20 Claims, 8 Drawing Sheets

MEASURING THE THROUGHPUT OF TRANSMISSIONS OVER WIRELESS LOCAL AREA NETWORKS

RELATED APPLICATIONS

This application is a continuation of U.S. application Ser. No. 10/087,045, filed on Feb. 28, 2002 now U.S. Pat. No. 7,009,957. The contents of the above cited patent application is hereby incorporated by reference in its entirety.

BACKGROUND

1. Field of the Invention

The present invention generally relates to wireless local area networks. More particularly, the present invention relates to measuring the throughput of transmissions over wireless local area networks.

2. Description of the Related Art

Computers have traditionally communicated with each other through wired local area networks ("LANs"). However, with the increased demand for mobile computers such as laptops, personal digital assistants, and the like, wireless local area networks ("WLANs") have developed as a way for computers to communicate with each other through transmissions over a wireless medium using radio signals, infrared signals, and the like.

In order to promote interoperability of WLANs with each other and with wired LANs, the IEEE 802.11 standard was developed as an international standard for WLANs. Generally, the IEEE 802.11 standard was designed to present users with the same interface as an IEEE 802 wired LAN, while allowing data to be transported over a wireless medium.

Although WLANs provide users with increased mobility over wired LANs, the quality of communications over a WLAN can vary for reasons that are not present in wired LANs. For example, everything in the environment can behave as a reflector or attenuator of a transmitted signal. As such, small changes in the position of a computer in a WLAN can affect the quality and strength of a signal sent by the computer and can affect the throughput of signals sent over the WLAN.

In a conventional system, throughput across a WLAN is measured by a computer in the WLAN using an echo request-reply mechanism that uses an OSI layer of layer 3 or above. However, components in a WLAN often cannot support an OSI layer of layer 3 or above or are inconvenient or administratively impractical to configure with an echo reply-request mechanism. Furthermore, processing data at layer 3 or above can add delay, and thus affect the calculated throughput.

Alternatively, a separate device that can support an OSI layer of layer 3 or above can be used with a computer sending transmissions to measure throughput across a WLAN. However, because the separate device is typically placed "behind" an access point receiving transmissions from the computer, the calculated throughput can include the extra path length between the device and access point, as well as delays and the effects of bottlenecks at the access point. Furthermore, processing data at layer 3 or above can add delay, and thus affect the calculated throughput.

SUMMARY

The present invention relates to measuring the throughput of transmissions over a wireless local area network having a station and an access point. In one embodiment, the station can send messages to the access point during a test period, where the messages can be sent as data frames. The access point can receive messages sent from the station during the test period. For messages received by the access point, the access point can send acknowledgements to the station, where the acknowledgements can be sent as control frames. The station can receive acknowledgements from the access point for messages received by the access point. The station can determine a throughput from the station to the access point for the test period based on the acknowledgements received at the station from the access point during the test period.

In another embodiment, messages can be sent from the station to the access point during a test period. Messages sent from the station can then be received at the access point during the test period. For messages received by the access point, the access point can send ACK frames to the station. The station can receive ACK frames from the access point for messages received by the access point. The access point can send the messages received from the station back to the station. The station can receive the messages from the access point. The station can determine a throughput from the station to the access point for the test period based on the ACK frames received by the station from the access point during the test period. Furthermore, the station can determine a throughput from the access point to the station for the test period based on the messages that are sent from the station to the access point and received by the station from the access point during the test period.

DESCRIPTION OF THE DRAWING FIGURES

The present invention can be best understood by reference to the following detailed description taken in conjunction with the accompanying drawing figures, in which like parts may be referred to by like numerals:

DETAILED DESCRIPTION

In order to provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

Figure 1:
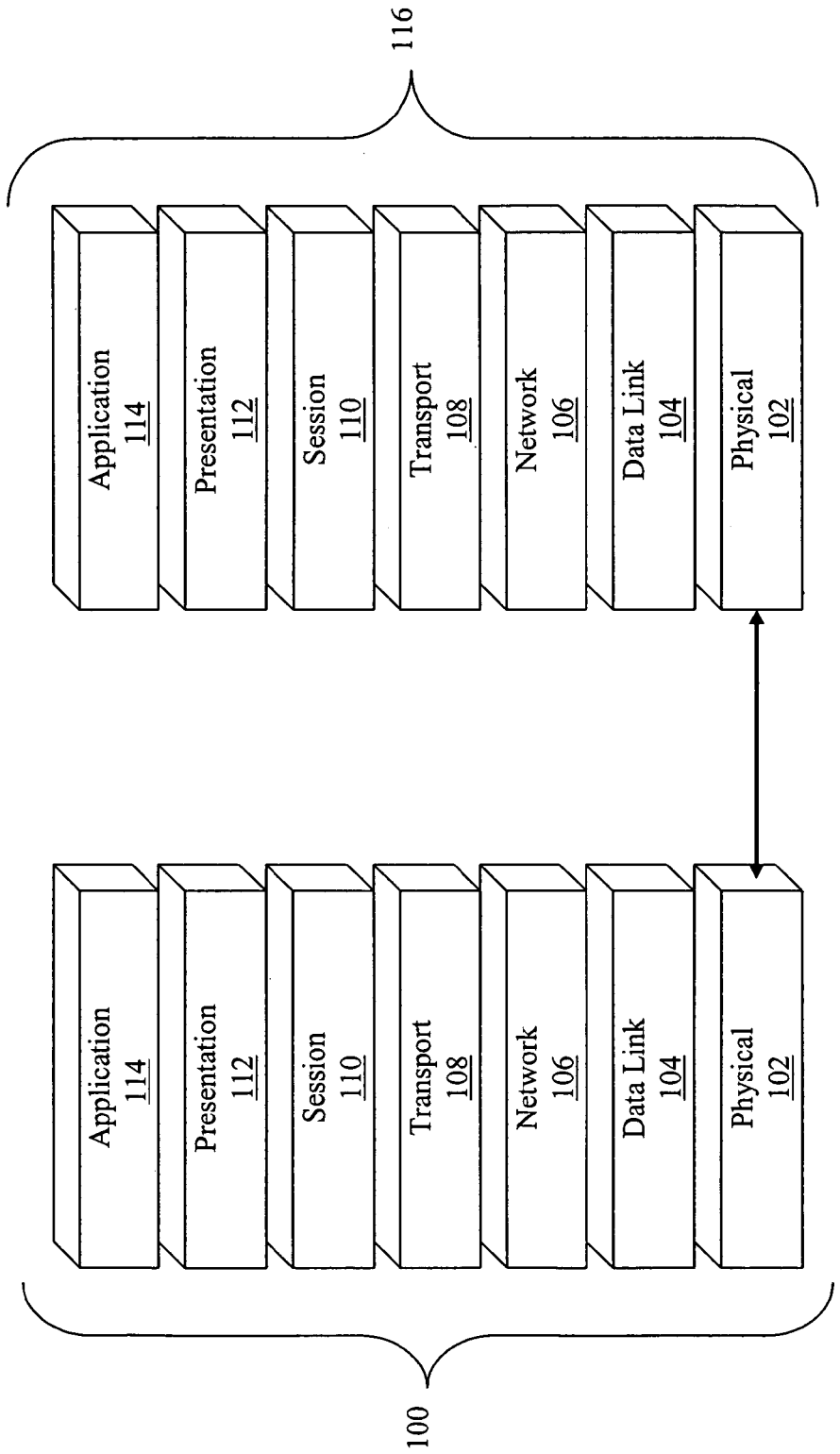
FIG. 1 shows an exemplary OSI seven layer model.

With reference to FIG. 1, an exemplary OSI seven layer model is shown, which represents an abstract model of a networking system divided into layers according to their respective functionalities. In particular, the seven layers include physical layer 102 corresponding to layer 1, data link layer 104 corresponding to layer 2, network layer 106 corresponding to layer 3, transport layer 108 corresponding to layer 4, session layer 110 corresponding to layer 5, presentation layer 112 corresponding to layer 6, and application layer 114 corresponding to layer 7. Each layer in the OSI model only interacts directly with the layer immediately above or below it, and different computers and 116 can communicate directly with each other only at the physical layer 102. However, different computers and 116 can effectively communicate at the same layer using common protocols. For example, in one exemplary embodiment, computer 100 can communicate with computer 116 at application layer 114 by propagating a frame from application layer 114 of computer through each layer below it until the frame reaches physical layer 102. The frame can then be transmitted to physical layer 102 of computer 116 and propagated through each layer above physical layer 102 until the frame reaches application layer 114 of computer 116.

The IEEE 802.11 standard for wireless local area networks ("WLANs") operates at the data link layer 104, which corresponds to layer 2 of the OSI seven layer model, as described above. Because IEEE 802.11 operates at layer 2 of the OSI seven layer model, layers 3 and above can operate according to the same protocols used with IEEE 802 wired LANs. Furthermore, layers 3 and above can be unaware of the network actually transporting data at layers 2 and below. Accordingly, layers 3 and above can operate identically in the IEEE 802 wired LAN and the IEEE 802.11 WLAN. Furthermore, users can be presented with the same interface, regardless of whether a wired LAN or WLAN is used.

Figure 2:
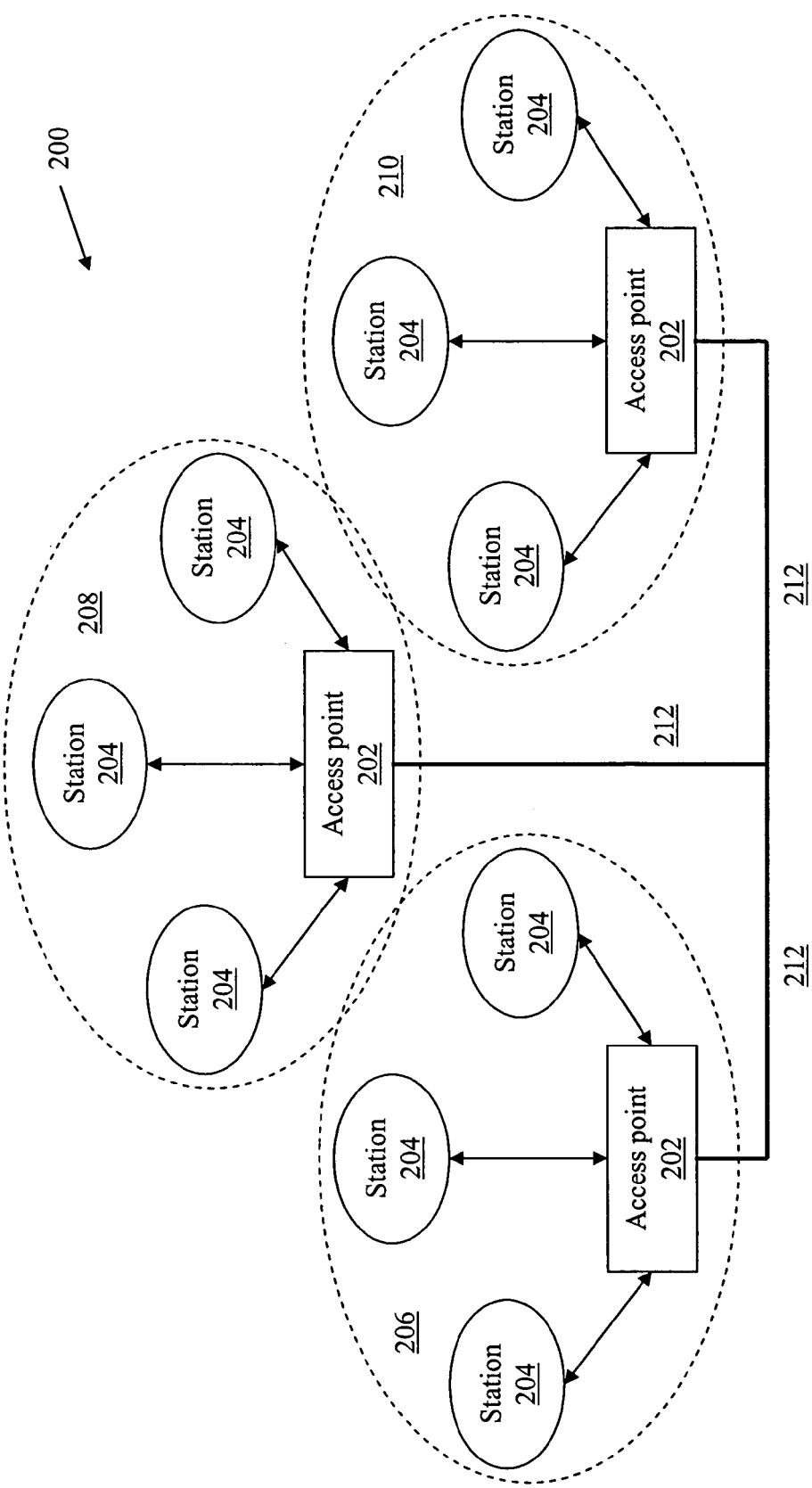
FIG. 2 shows an exemplary extended service set in a wireless local area network ("WLAN")

With reference to FIG. 2, an exemplary extended service set 200, which forms a WLAN according to the IEEE 802.11 standard, is depicted having basic service sets ("BSS") 206,208, and 210. Each BSS can include an access point ("AP") 202 and stations 204. A station 204 is a component that can be used to connect to the WLAN, which can be mobile, portable, stationary, and the like, and can be referred to as the network adapter or network interface card. For instance, a station 204 can be a laptop computer, a personal digital assistant, and the like. In addition, a station 204 can support station services such as authentication, deauthentication, privacy, delivery of data, and the like.

Each station 204 can communicate directly with an AP 202 through an air link, such as by sending a radio or infrared signal between WLAN transmitters and receivers. Each AP 202 can support station services, as described above, and can additionally support distribution services, such as association, disassociation, association, distribution, integration, and the like. Accordingly, an AP 202 can communicate with stations 204 within its BSS 206, 208, and 210, and with other APs 202 through medium 212, called a distribution system, which forms the backbone of the WLAN. This distribution system 212 can include both wireless and wired connections.

Figure 3:
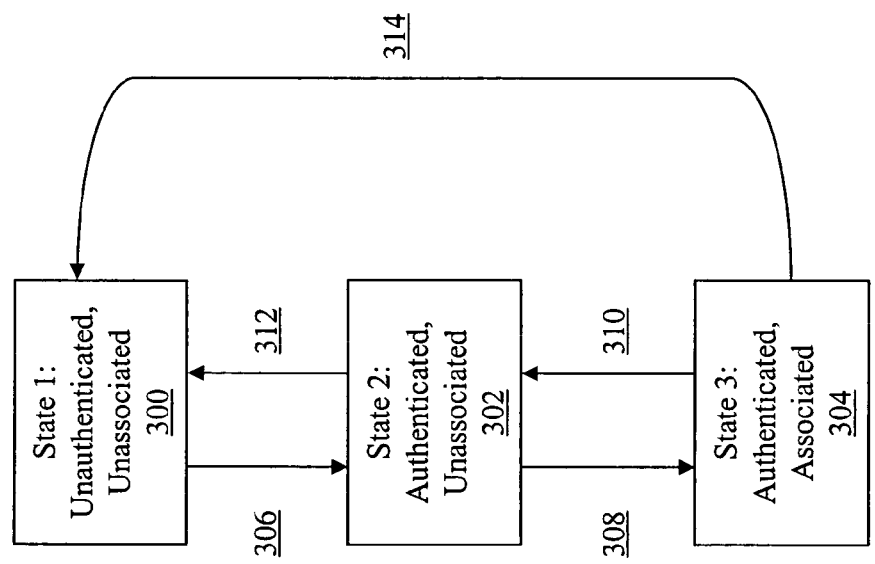
FIG. 3 is an exemplary flow diagram illustrating various states of stations in a WLAN.

With reference to FIGS. 2 and 3, each station 204 must be authenticated to and associated with an AP 202 in order to become a part of a BSS 206, 208, or 210, under the IEEE 802.11 standard. Accordingly, with reference to FIG. 3, a station 204 begins in State 1 (300), where station 204 is unauthenticated to and unassociated with an AP 202. In State 1 (300), station 204 can only use a limited number of frame types, such as frame types that can allow station 204 to locate and authenticate to an AP 202, and the like.

If station 204 successfully authenticates 306 to an AP 202, then station 204 can be elevated to State 2 (302), where station 204 is authenticated to and unassociated with the AP 202. In State 2 (302), station 204 can use a limited number of frame types, such as frame types that can allow station 204 to associate with an AP 202, and the like.

If station 204 then successfully associates or reassociates 308 with AP 202, then station 204 can be elevated to State 3 (304), where station 204 is authenticated to and associated with AP 202. In State 3 (304), station 204 can use any frame types to communicate with AP 202 and other stations 204 in the WLAN. If station 204 receives a disassociation notification 310, then station 204 can be transitioned to State 2. Furthermore, if station 204 then receives deauthentication notification 312, then station 204 can be transitioned to State 1. Under the IEEE 802.11 standard, a station 204 can be authenticated to different APs 202 simultaneously, but can only be associated with one AP 202 at any time.

With reference again to FIG. 2, once a station 204 is authenticated to and associated with an AP 202, the station 204 can communicate with another station 204 in the WLAN. In particular, a station 204 can send a message having a source address, a basic service set identification address ("BSSID"), and a destination address, to its associated AP 202. The AP 202 can then distribute the message to the station 204 specified as the destination address in the message. This destination address can specify a station 204 in the same BSS 206, 208, or 210, or in another BSS 206, 208, or 210 that is linked to the AP 202 through distribution system 212.

Although FIG. 2 depicts an extended service set 200 having three BSSs 206, 208, and 210, each of which include three stations 204, it should be recognized that an extended service set 200 can include any number of BSSs 206, 208, and 210, which can include any number of stations 204.

As noted earlier, WLANs can provide users with increased mobility, in comparison to wired LANs, but the quality of communications over a WLAN can vary for reasons that are not present in wired LANs. For example, everything in the environment can behave as a reflector or attenuator of a transmitted signal, thereby affecting RF signal interference, multipath, attenuation, and the like.

These environmental impacts, which are not typically present in wired LANs, can contribute to the reduced reliability of transmissions over the WLAN medium, as compared to transmissions over a wired LAN. Accordingly, the IEEE 802.11 standard includes various frame exchange protocols to address this decreased reliability. In particular, the IEEE 802.11 MAC uses a frame exchange protocol at the data link layer 104 (FIG. 1), which is designed to notify a station 204 sending a message that the message has been received by an intended station 204.

Figure 4:
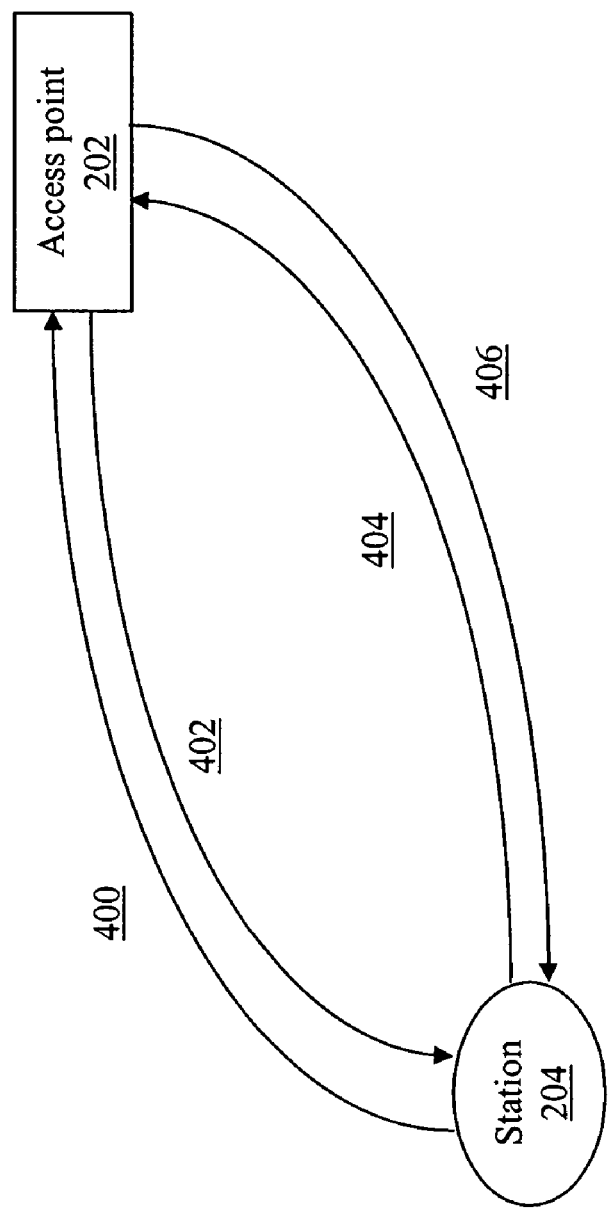
FIG. 4 shows an exemplary sequence of frame exchanges between a station and access point.

In particular, with reference to FIG. 4, after station 204 is authenticated to and associated with AP 202, station 204 can send a request to send ("RTS") frame 400 to AP 202. After AP 202 detects that the wireless medium is free from other traffic that could interfere with a frame sent by station 204, AP 202 can send a clear to send ("CTS") frame 402 to station 204. After station 204 receives CTS frame 402, station 204 can send a message 404 to AP 202. When AP 202 receives this message 404, AP 202 can send an acknowledgement ("ACK") frame 406 to station 204, indicating that AP 202 received the message 404 sent by station 204.

If no ACK frame is received by station 204, then station 204 can retry sending message 404. In some applications, a retry limit can be set, such that station 204 stops trying to send message 404 after this limit is reached. If station 204 stops trying to send message 404 and does not receive an ACK frame 406, then this is considered a loss.

The messages described above are sent as data frames according to the IEEE 802.11 standard. More particularly, in accordance with the current IEEE 802.11 standard, data frames can have lengths of at least 29 bytes. In contrast, the RTS, CTS, and ACK frames are sent as control frames. In accordance with the current IEEE 802.11 standard, control frames have lengths of at most 20 bytes. For instance, a standard IEEE 802.11 ACK frame has a length of 14 bytes. It should be noted that these size limitations for data frames and control frames may change if the IEEE 802.11 standard is revised.

In addition to being smaller in size than data frames, control frames are solely generated at the data link layer 104 (FIG. 1) and below. For example, when a message is received, an ACK frame is automatically generated at and sent out from data link layer 104 (FIG. 1) at AP 202. As such, the received message does not need to be processed above data link layer 104 (FIG. 1) in order for the ACK frame to be generated and sent.

Although the above-described frame exchange protocol includes sending RTS and CTS frames, it should be recognized that these frames can be omitted in some applications. However, sending these frames can reduce the number of collisions between frames being sent over a WLAN.

The above-described frame exchange protocol can affect the throughput of transmissions over a WLAN because each frame sent according to the protocol consumes bandwidth and time. In particular, the use of the RTS/CTS frames, acknowledge frames, and retry limits can affect the throughput. Furthermore, the size of the messages sent, the transmission speeds at which the messages are sent, and the fragmentation threshold for the messages can affect the throughput across a WLAN. Accordingly, measuring throughput can be useful in assessing the quality of communications over at the WLAN at any given time. In addition, measuring throughput across a WLAN can also be useful in assessing wireless equipment performance.

As noted earlier, throughput across a WLAN can be measured by a station 204 using an echo request-reply mechanism such as an ICMP echo request or an UDP echo application, which uses an OSI layer of layer 3 or above (FIG. 1), such as network layer 106, transport layer 108, application layer 114, and the like. In particular, with reference again to FIG. 2, a station 204 can send an echo request to its associated AP 202. In response, the AP 202 can send an echo reply to the station 204. Throughput across the WLAN can then be calculated based on this echo reply-request mechanism. However, using this echo request-reply mechanism includes various disadvantages.

For example, one disadvantage to an echo request-reply mechanism is that the echo reply is a data frame and not a standard IEEE 802.11 control frame. As such, unlike an ACK frame, the echo reply is generated above the data link layer 104 (FIG. 1). However, the components in the WLAN support may not support an OSI layer above the data link layer 104 (FIG. 1). For instance, station 204 may not be able to support an OSI layer of layer 3 or above. Furthermore, the AP 202 that connects station 204 to the WLAN may not have an IP address to support activities on network layer 106. In addition, AP 202 may be unable to run an application that can perform an echo reply-request. However, even if station 204 can support an OSI layer of layer 3 or above, processing data at layer 3 or above can add delay, and thus affect the calculated throughput. Furthermore, configuring station 204 with an echo reply-request mechanism can be inconvenient or administratively impractical.

Another disadvantage relates to using a separate device that can support an OSI layer of layer 3 or above. In particular, with reference again to FIG. 2, the device can be placed "behind" AP 202, such that AP 202 is positioned between the device and station 204. Station 204 can send an echo request to AP 202 that is also received by the device. The device can then send an echo reply to station 204. However, because the device sending the echo reply is placed along a wired connection behind AP 202, the calculated throughput can include the extra path length between AP 202 and the device, as well as delays and the effects of bottlenecks at AP 202. In addition, processing data at layer 3 or above can add delay, and thus affect the calculated throughput.

Accordingly, various exemplary embodiments of the present invention use the existing infrastructure provided by the IEEE 802.11 standard to calculate throughput across a WLAN. More particularly, in various exemplary embodiments, throughput across a WLAN can be measured by a station 204 using existing infrastructure at an OSI layer of layer 2 or below.

Figure 6:
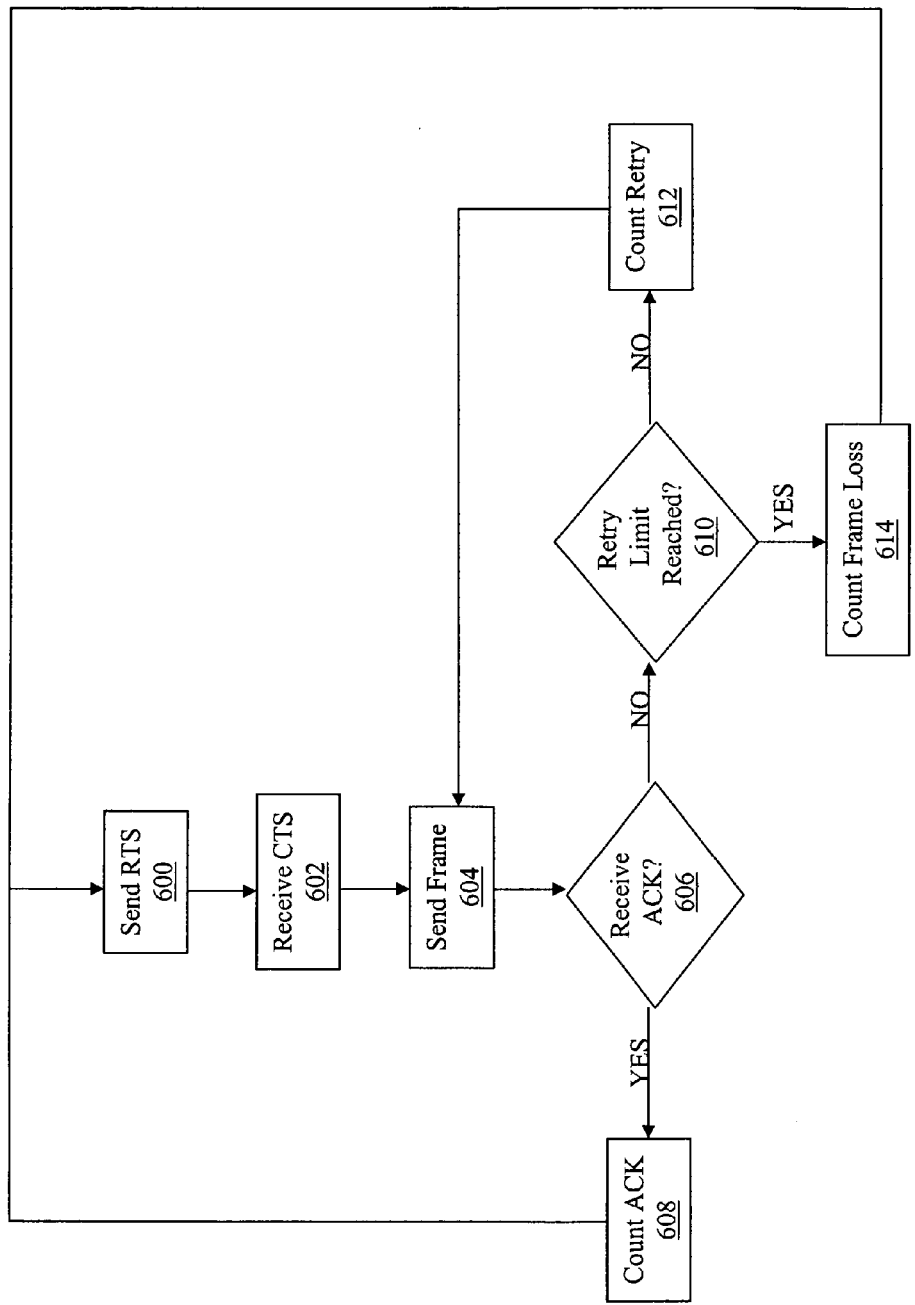
FIG. 6 shows an exemplary flow diagram of a process that can be used to measure throughput in a WLAN system.

FIG. 6 shows an exemplary process that can be used to measure throughput in a WLAN system using the system shown in FIG. 4. Generally, throughput from station 204 to AP 202 can be measured in bits per second (bps) according to the following equation:

$$\text{Throughput} = \frac{(\text{\# data frames}) \times (\text{bits per data frame})}{\text{time}}$$

Accordingly, throughput can be measured by sending data frames sequentially from station 204 to AP 202 over a specified period of time. If the data frames sent have a known size and the time for sending the sequence of data frames is specified, throughput can be calculated from the number of data frames successfully received by AP 202 during the specified time.

Figure 5:
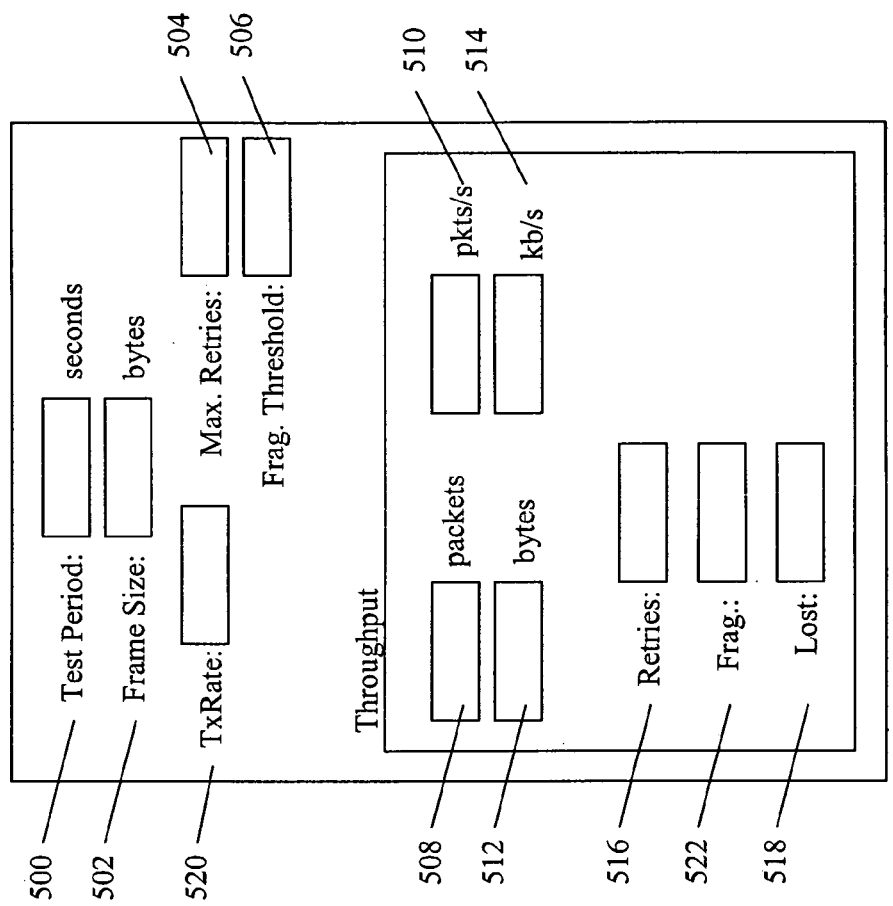
FIG. 5 shows an exemplary interface that can be used to set and display parameters relating to throughput measurement.

With reference to FIG. 5, an exemplary interface that can be used to set parameters for throughput measurement is depicted. More particularly, a user, administrator, or the like, can specify a test period 500 and the frame size 502 of the frames to be sent sequentially during the test period. Furthermore, the user, administrator, or the like, can specify a retry limit 504, as described above with regard to FIG. 4, and a fragmentation threshold 506 that indicates the maximum size that data frames can be transmitted without being fragmented into smaller sized data frames. It should be recognized that the retry limit 504 and fragmentation threshold 506 can be omitted in some applications, such as when there is no retry limit or when data frames sent are of a specified size that do not require fragmentation.

With reference to FIGS. 4 and 6, after the parameters for throughput measurement are set, then the test period can be started. Next, in step 600, station 204 can send a RTS frame 400 to AP 202. After AP 202 detects that the wireless medium is free from other traffic that could interfere with a frame sent by station 204, then in step 602, AP 202 can send a CTS frame 402 to station 204. However, it should be recognized that steps 600 and 602 can be omitted in some applications. For instance, although sending CTS and RTS frames can reduce collisions between subsequent data frames sent over a WLAN, CTS and RTS frames can be omitted if collisions are acceptable in a particular application.

Figure 7:
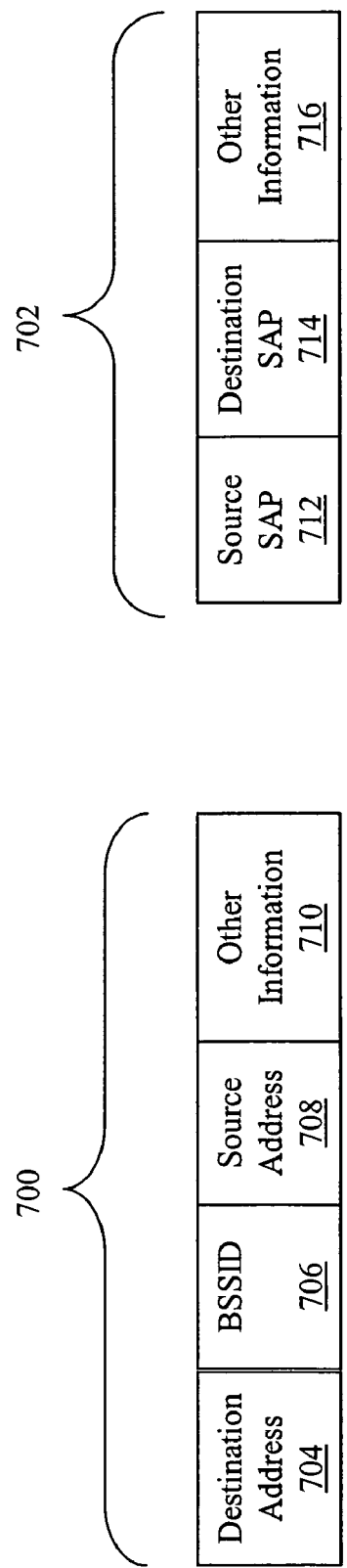
FIG. 7 shows headers that can be included in a frame.

After station 204 receives CTS frame 402, then in step 604, station 204 can send a data frame 404 to AP 202. With reference to FIG. 7, data frame 404 can include an IEEE 802.11 header 700 and an IEEE 802.2 header 702. IEEE 802.11 header 700 can include destination address 704, BSSID 706, source address 708, and other information 710. In the present exemplary embodiment, destination address 704 can be set to AP 202, BSSID 706 can be set to AP 202, and source address 708 can be set to station 204. Furthermore, IEEE 802.2 header 702 can include source service access point ("SAP") 712, destination SAP 714, and other information 716. In some configurations, destination SAP 714 can be set to a null SAP in order to prevent AP 202 from processing data frame 404 to determine its contents. By preventing AP 202 from processing data frame 404 in this manner, AP 202 can process other data frames and reduce bottlenecking and delays at AP 202. However, it should be recognized that preventing AP 202 from processing data frame 404 by setting destination SAP 714 to a null SAP can be omitted in some applications. For instance, if delays and bottlenecking at AP 202 are not problematic, setting destination SAP 714 to a null SAP address can be omitted.

If AP 202 receives this data frame 404, AP 202 can send an ACK frame 406 to station 204, indicating that AP 202 received the data frame 404 sent by station 204. Accordingly, in step 606, if station 204 receives ACK frame 406, then in step 608, station 204 can count the ACK frame as a frame that can be included in the equation for throughput described above. After the ACK frame is counted, then the cycle can be repeated beginning at step 600.

However, if station 204 does not receive ACK frame 406 within a specified period of time, then in step 610, station 204 can determine whether the specified retry limit 504 (FIG. 5) has been reached. If the retry limit has not been reached, then in step 612, a retry can be counted against this limit. Then, step 604 can be repeated and data frame 404 can be resent. In step 606, station 204 can determine if ACK frame 406 has been received within a specified period of time, as described above.

Alternatively, if the specified retry limit 504 (FIG. 5) has been reached, then in step 614, a frame loss can be counted and the cycle can be repeated beginning at step 600.

The above-described cycle, as depicted in FIG. 6, can be repeated throughout the test period 500 (FIG. 5). At the end of the test period, the throughput results can be displayed to the user, administrator, or the like, as shown in FIG. 5. More particularly, the number of ACKs counted in step 608 (FIG. 6) can be displayed as the number of packets 508 received by AP 202. This number of packets 508 can be used to calculate throughput in packets per second 510 by dividing the number of packets 508 by the test period 500. Furthermore, the number of packets 508 can be multiplied by the frame size 502 to calculate the total number of bytes 512 successfully transmitted from station 204 to AP 202 during the test period 500. From this total number of bytes 512, along with the test period 500, throughput in kilobytes per second 514 can be calculated. In addition, the number of retries 516 counted in step 612 (FIG. 6) during the test period 500 can be calculated. The number of frames lost 518, as counted in step 614 (FIG. 6) during the test period 500, can also be calculated.

Although FIG. 5 depicts particular input parameters and display parameters in an exemplary configuration, it should be recognized that various input parameters and display parameters can be modified, omitted, or added, depending on the application. Furthermore, the input parameters and display parameters can be configured in any manner, depending on the application. For instance, the transmission rate 520 can be added as an input parameter. More particularly, a user, administrator, or the like can specify which IEEE 802.11 rate should be used to transmit data frames 404 over the WLAN, such as 1 mbps, 2 mbps, 5.5 mbps, 11 mbps, and the like. Another example includes displaying the number of frames 404 fragmented 522 during the test period based on the specified fragmentation threshold 506.

Figure 8:
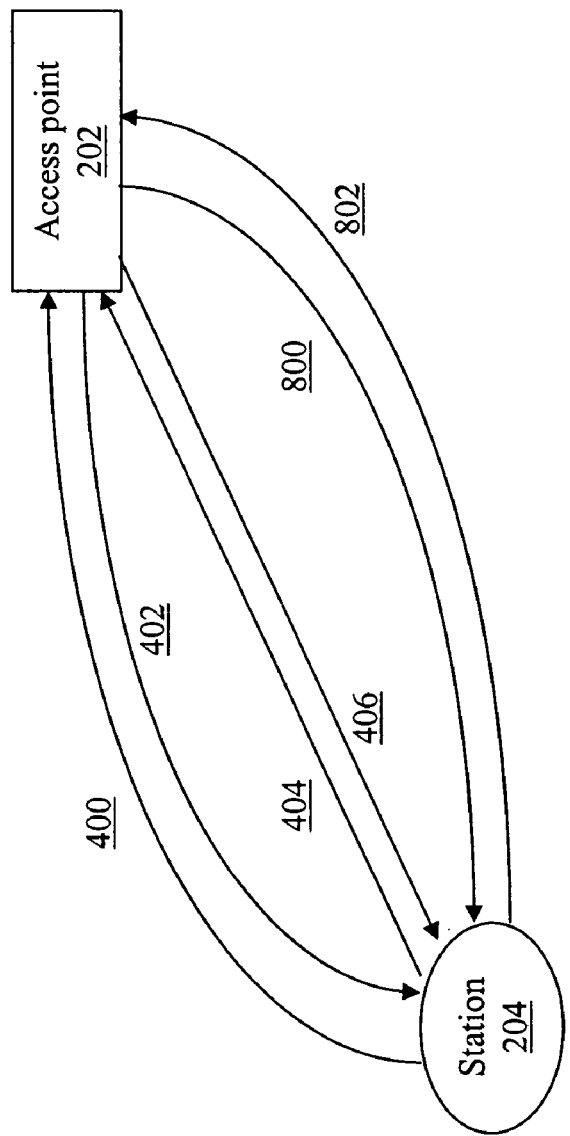
FIG. 8 shows another exemplary sequence of frame exchanges between a station and access point.

FIG. 8 depicts another exemplary system and process that can be used to measure throughput in a WLAN system. As depicted in FIG. 8, the present embodiment includes second data frame 800 and ACK frame 802, and can be used to measure throughput from AP 202 to station 204.

More particularly, with reference to FIGS. 6 and 8, after the parameters for throughput measurement are set (FIG. 5), the test period can be started. Next, in step 600, station 204 can send a RTS frame 400 to AP 202. After AP 202 detects that the wireless medium is free from other traffic that could interfere with a frame sent by station 204, then in step 602, AP 202 can send a CTS frame 402 to station 204. However, it should be recognized that steps 600 and 602 can be omitted in some applications. For instance, although sending CTS and RTS frames can reduce collisions between subseqent data frames sent over a WLAN, CTS and RTS frames can be omitted if collisions are acceptable in a particular application.

After station 204 receives CTS frame 402, then in step 604, station 204 can send a first data frame 404 to AP 202. With reference again to FIG. 7, data frame 404 can include an IEEE 802.11 header 700. IEEE 802.11 header 700 can include destination address 704, BSSID 706, source address 708, and other information 710. In the present exemplary embodiment, destination address 704 can be set to station 204, BSSID 706 can be set to AP 202, and source address 708 can be set to station 204. By setting destination address 704 to station 204, first data frame 404 can travel from station 204 to AP 202 and from AP 202 to station 204, thereby creating two-way traffic between station 204 and AP 202 that can be more symmetric than the traffic created in the exemplary embodiment described above with regard to FIGS. 4 and 6. This two-way traffic can affect the throughput from station 204 to AP 202 and the throughput from AP 202 to station 204 depending on factors such as the processing capacity of station 204, the processing capacity of AP 202, bandwidth, and the like.

If AP 202 receives this first data frame 404, AP 202 can send an ACK frame 406 to station 204, indicating that AP 202 received the data frame 404 sent by station 204. Next, in step 606, station 204 can determine if it has received ACK frame 406 within a specified period of time. If station 204 does receive ACK frame 406 within a specified period of time, then in step 608, station 204 can count the ACK frame as a frame that can be included in the equation for throughput from station 204 to AP 202 described above with regard to FIGS. 4 and 6. After the ACK frame is counted, then the cycle can be repeated beginning at step 600. Although the present embodiment includes counting ACK frame 406, it should be recognized that counting ACK frames can be omitted in some applications. For instance, counting ACK frames can be omitted if throughput from station 204 to AP 202 is not measured.

If station 204 does not receive ACK frame 406 within a specified period of time, then in step 610, station 204 can determine whether the specified retry limit 504 (FIG. 5) has been reached. If the retry limit has not been reached, then in step 612, a retry can be counted against this limit. Then, step 604 can be repeated and first data frame 404 can be resent. In step 606, station can determine if ACK frame 406 has been received within a specified period of time, as described above.

Alternatively, if the specified retry limit 504 (FIG. 5) has been reached, then in step 614, a frame loss can be counted and the cycle can be repeated beginning at step 600.

As shown in FIG. 8, when AP 202 receives a first data frame 404 from station 204, AP 202 can then send first data frame 404 back to station 204 as second data frame 800, based on the destination address 704 set in first data frame 404. If station 204 receives second data frame 800, station 204 can count the second data frame as a frame that can be included in the equation described above with regard to FIGS. 4 and 6 to calculate throughput from AP 202 to station 204. In addition, station 204 can send ACK frame 802 to AP 202 after receiving second data frame 800, indicating that station 204 received second data frame 800.

The above-described cycle can be repeated throughout the test period 500 (FIG. 5). At the end of the test period, the throughput results can be displayed to the user, administrator, or the like, as shown in FIG. 5. More particularly, the number of second data frames counted can be displayed as the number of packets 508 received by station 204. This number of packets 508 can be used to calculate throughput in packets per second 510 by dividing the number of packets 508 by the test period 500. Furthermore, the number of packets 508 can be multiplied by the frame size 502 to calculate the total number of bytes 512 successfully transmitted from AP 202 to station 204 during the test period 500. From this total number of bytes 512, along with the test period 500, throughput in kilobytes per second 514 can be calculated. In addition, the number of retries 516 counted in step 612 (FIG. 6) during the test period 500 can be calculated. The number of frames lost 518, as counted in step 614 (FIG. 6) during the test period 500, can also be calculated.

Although FIG. 5 depicts particular input parameters and display parameters in an exemplary configuration, it should be recognized that various input parameters and display parameters can be modified, omitted, or added, depending on the application. For instance, the number of ACK frames 406 received by station 204 can also be displayed, as well as throughput from station 204 to AP 202. Furthermore, the input parameters and display parameters can be configured in any manner, depending on the application.

Furthermore, with regard to the exemplary embodiments described above, the input parameters and display parameters, such as those shown in FIG. 5, can be included in station 204. As described above, station 204 can be mobile, portable, stationary, and the like. For instance, station 204 can be a laptop computer, a personal digital assistant, and the like. In addition, station 204 can be used by a user as a diagnostic tool, by an administrator as an administrative tool, and the like, to assess the quality of communications in the WLAN.

Calculating a transmission time or the throughput according to the exemplary embodiments described above provides advantages over using an echo request-reply mechanism that uses an OSI layer of layer 3 or above. In particular, by using the existing infrastructure provided by the IEEE 802.11 medium access control ("MAC") to calculate transmission time or throughput across a WLAN, the components of the WLAN only need to support an OSI layer of layer 2, thereby circumventing various disadvantages of using an echo request reply mechanism that utilizes layer 3 or above of the OSI model.

More particularly, in the present exemplary embodiment, AP 202 does not need to be modified to run an application in order to allow station 204 to calculate transmission times or throughput. In addition, the AP 202 that connects station 204 to AP 202 does not need to support activities on network layer 106 or on any higher layer of the OSI model. Furthermore, delay due to processing data at layer 3 or above can be reduced with the present exemplary embodiment by processing data at layer 2 or below. Moreover, station 204 does not need to be configured with an echo reply-request mechanism that can be inconvenient or administratively impractical to configure.

Additionally, the present exemplary embodiment reduces the need to use a separate device that can support an OSI layer of layer 3 or above. Accordingly, the calculated throughput of the present exemplary embodiment can be more accurate than calculations from a separate device because the present exemplary embodiment does not include the extra path length between a separate device and AP 202, or any increased delays or effects of bottlenecks due to including this extra path length.

The present invention also relates to apparatus for performing the operations herein. This apparatus may be a computer to execute a computer program stored in a computer readable storage medium.

Furthermore, the present exemplary embodiment provides an additional advantage of using the existing architecture of the IEEE 802.11 standard. By using this existing architecture, throughput of the WLAN can be calculated conveniently with little expense. Additionally, because AP 202 is not modified according to the present exemplary embodiment, station 204 can be used to calculate throughput of the WLAN at various locations and using various APs 202.

Although the present invention has been described with respect to certain embodiments, examples, and applications, it will be apparent to those skilled in the art that various modifications and changes may be made without departing from the invention.

We claim:

1. A method of measuring the throughput of transmissions from a station to an access point over a wireless local area network, the method comprising:

sending messages from the station to the access point during a test period, receiving acknowledgements at the station,
    wherein the acknowledgements are sent to the station from the access point for each message received by the access point during the test period; and determining a throughput for the test period based on the number of acknowledgements received at the station from the access point during the test period.

2. The method of claim 1, wherein the messages are sent to the access point as data frames, and wherein the acknowledgements are sent to the station as control frames.

3. The method of claim 1, wherein sending messages includes:

sending a first message from the station to the access point;

determining if an acknowledgement for the first message has been received at the station;

resending the first message if the station fails to receive an acknowledgement from the access point and if a retry limit has not been reached;

counting a frame loss for the first message if the station fails to receive an acknowledgement for the first message from the access point and if a retry limit has been reached; and sending a second message from the station to the access point after receiving an acknowledgement at the station for the first message or counting a frame loss for the first message.

4. The method of claim 1, wherein determining a throughput for the test period further comprises:
determining the throughput in bits per second based on the test period, the number of acknowledgements received at the station from the access point during the test period, and a number of bits included in each of the messages sent from the station to the access point during the test period.

5. The method of claim 1, further comprising:
sending a request to send frame from the station to the access point before sending each message; and
receiving a clear to send frame at the station from the access point before sending each message.

6. The method of claim 1, further comprising:
receiving messages at the station sent from the access point,
wherein the access point sent the messages to the station after receiving the messages from the station; and
determining a throughput from the access point to the station for the test period based on the messages received by the station from the access point during the test period.

7. The method of claim 6, wherein determining a throughput from the access point to the station for the test period further comprises:
determining the throughput in bits per second based on the test period, the number of messages received at the station from the access point during the test period, and a number of bits included in each of the messages sent from the station to the access point during the test period.

8. A computer-readable storage medium containing computer executable code when executed by a computer, cause the computer to measure the throughput of transmission from a station to an access point over a wireless local area network by instructing the computer to operate as follows:
sending messages from the station to the access point during a test period,
receiving acknowledgements at the station, wherein the acknowledgements are sent to the station from the access point for each message received by the access point during the test period; and
determining a throughput for the test period based on the number of acknowledgements received at the station from the access point during the test period.

9. The computer-readable storage medium of claim 8, wherein the messages are sent as data frames, and wherein the acknowledgements are sent to the station as control frames.

10. The computer-readable storage medium of claim 8, wherein sending messages includes:
sending a first message from the station to the access point;
determining if an acknowledgement for the first message has been received at the station; and
resending the first message if the station fails to receive an acknowledgement from the access point and if a retry limit has not been reached.

11. The computer-readable storage medium of claim 10, further comprising:
counting a frame loss for the first message if the station fails to receive an acknowledgement for the first message from the access point and if a retry limit has been reached; and
sending a second message from the station to the access point after receiving an acknowledgement at the station for the first message or counting a frame loss for the first message.

12. The computer-readable storage medium of claim 8, wherein determining a throughput for the test period further comprises:
determining the throughput in bits per second based on the test period, the number of acknowledgements received at the station from the access point during the test period, and a number of bits included in each of the messages sent from the station to the access point during the test period.

13. The computer-readable storage medium of claim 8, further comprising:
sending a request to send frame from the station to the access point before sending each message; and
receiving a clear to send frame at the station from the access point before sending each message.

14. The computer-readable storage medium of claim 8, further comprising:
receiving messages at the station from the access point,
wherein the access point sends the messages to the station after receiving the messages from the station; and
determining a throughput from the access point to the station for the test period based on the messages received by the station from the access point during the test period.

15. The computer-readable storage medium of claim 14, wherein determining a throughput from the access point to the station for the test period further comprises:
determining the throughput in bits per second based on the test period, the number of messages received at the station from the access point during the test period, and a number of bits included in each of the messages sent from the station to the access point during the test period.

16. A system for measuring the throughput of transmissions over a wireless local area network, the system comprising:
a station configured to:
send messages to the access point during a test period,
receive acknowledgements from the access point during the test period; and
determine a throughput for the test period based on the acknowledgements received from the access point during the test period.

17. The system of claim 16, wherein the messages are sent as data frames, and wherein the acknowledgements are sent to the station as control frames.

18. The system of claim 16, wherein the station is configured to send messages is configured to:
send a first message from the station to the access point,
determine if an acknowledgement for the first message has been received at the station,
resend the first message if the station fails to receive an acknowledgement from the access point and if a retry limit has not been reached,
count a frame loss for the first message if the station fails to receive an acknowledgement for the first message from the access point and if a retry limit has been reached; and
send a second message from the station to the access point after receiving an acknowledgement at the station for the first message or counting a frame loss for the first message.

19. The system of claim 16, wherein the station configured to determine a throughput for the test period is further configured to determine the throughput in bits per second based on the test period, the number of acknowledgements received at the station from the access point during the test period, and a number of bits included in each of the messages sent from the station to the access point during the test period.

20. The system of claim 16, wherein the station is further configured to:

receive messages at the station from the access point,
wherein the access point sends the messages to the station after receiving the messages from the station; and determine a throughput from the access point to the station for the test period based on the messages received by the station from the access point during the test period.

* * * * *